United States Patent [19]
Sandt et al.

[11] Patent Number: 4,714,377
[45] Date of Patent: Dec. 22, 1987

[54] METHOD OF LAYING PIPE SECTIONS

[75] Inventors: Hartley Sandt, Orange Park; Henry Happy, Jacksonville, both of Fla.

[73] Assignee: Price Brothers Company, Dayton, Ohio ; a part interest

[21] Appl. No.: 923,966

[22] Filed: Oct. 28, 1986

Related U.S. Application Data

[62] Division of Ser. No. 698,020, Feb. 4, 1985, Pat. No. 4,647,080.

[51] Int. Cl.⁴ .............................................. B63B 35/04
[52] U.S. Cl. ..................................... 405/154; 29/407; 29/450; 29/460; 141/59; 264/263
[58] Field of Search ................... 29/407, 460, 450; 53/432; 405/154, 179; 264/263; 285/294, 297, 347, 423; 141/7, 8, 59

[56] References Cited

U.S. PATENT DOCUMENTS

| | | | |
|---|---|---|---|
| 339,036 | 3/1886 | Wilbur | 285/294 |
| 935,376 | 9/1909 | Lennon | 285/297 X |
| 1,251,973 | 1/1918 | Kurtz | 285/294 |
| 2,236,862 | 4/1941 | Williams et al. | 29/455 X |
| 2,402,723 | 6/1946 | Bean | 29/407 X |
| 2,518,100 | 8/1950 | Tomkins | 141/8 X |
| 2,686,091 | 8/1954 | Young | 29/460 UX |
| 3,026,611 | 3/1962 | DuBois | 29/407 X |
| 3,137,744 | 6/1964 | Burrus | 29/460 UX |
| 3,606,401 | 9/1971 | Schwarz | 285/297 X |

FOREIGN PATENT DOCUMENTS

| | | | |
|---|---|---|---|
| 9330 | of 1884 | United Kingdom | 285/297 |
| 1293371 | 10/1972 | United Kingdom | 285/297 |

Primary Examiner—Charlie T. Moon
Attorney, Agent, or Firm—Arthur G. Yeager

[57] ABSTRACT

Joint for telescoping pipe sections including aligned recesses in both sections, sealing gaskets spaced apart from both edges of the recesses and compressed against both pipe sections, and solidifiable grout filling the recesses and all space between the sealing gaskets. A method of laying pipe sections underground and sealing the pipe joints from above ground.

20 Claims, 4 Drawing Figures

METHOD OF LAYING PIPE SECTIONS

This is a divisional of co-pending application Ser. No. 06/698,020 filed on Feb. 4, 1985, now U.S. Pat. No. 4,647,080.

BACKGROUND OF THE INVENTION

Large diameter pipe is normally laid in sections that are joined together by means other than threaded joints. A typical system involves pipe sections having a spigot on one end and a bell on the other end. The spigot of one section is designed to telescope into the bell of the next adjoining section and the space between the bell and the spigot is filled with packing to prevent any leaks and contain the fluid to be carried in the pipe. Usually such pipe is laid in trenches, assembled and sealed in the trench, and then the trench is back filled with earth. Many problems have developed with such piping, which may be concrete, metal, plastic, or a combination of these. The packing and sealing usually is done by hand with the result that no two joints are assembled in exactly the same way, and they, therefore, have different strengths and weaknesses. Furthermore, the shifting and settling of the earth produces stresses that the joint cannot absorb. The use of cement grout produces a brittle joint that cracks under minor flexural stress and adheres to the precast pipe only with great difficulty. The slightest longitudinal stress easily produces cracks and fractures of the grout, particularly along the interface of the grout and the precast pipe section.

In more recent times there have been improvements suggested such as that of U.S. Pat. No. 4,226,444 to Bunyan in which two straight pipe sections are abutted with a sleeve encircling the butt joint. The sleeve is sealed at each end with an inflatable ring and the space between the rings is filled with an epoxy resin which is allowed to harden under pressure. The resulting joint depends on a thin cylindrical film of epoxy resin which readily breaks at the pipe interface when the pipe sections are placed under tensile and flexural stresses.

It is an object of this invention to provide a novel improved pipe joint. It is another object of this invention to provide a bell-and-spigot pipe joint having a keyway to be filled with grout. Still another object is to provide a method of laying an underground pipeline and sealing it after the pipeline has been covered with earth and stabilized. Other objects will appear from the more detailed description which follows.

BRIEF DESCRIPTION OF THE INVENTION

This invention relates to a pipe joint in which an inner pipe section is telescoped into an outer pipe section, which comprises a broad circumferential recess in the outer surface of the inner pipe section and two narrow circumferential grooves, each spaced respectively apart from each edge of the recess, a compressible resilient ring sealing gasket in each of said grooves, and in compressive contact with the inside surface of the outer section, a broad circumferential recess on the inside surface of the outer section positioned to be in alignment with the recess of the inner section when the sections are telescoped to their joined position, the edges of both recesses being angularly disposed with respect to the inside surface of the outer section and the outside surface of the inner section, two diametrically opposed passageways through the outer section from the outside surface to the bottom of the recess and a fluid solifiable grout filling all of the volume of the recesses, the two passageways, and the remaining space between the inner and outer sections and the two gaskets.

This invention also relates to a method of laying, testing, and assembling sections of pipe into an indefinite length of piping which comprises the sequential steps of:

(1) positioning an inner pipe section and an outer pipe section in general longitudinal alignment for joining by telescoping the two sections together, the two sections when joined having aligned circumferential recesses in their facing surfaces adjacent the telescoping ends, and the inner section having a pair of circumferential grooves spaced on opposite ends of the recess;

(2) placing two spaced ring sealing gaskets around the inner section respectively in the grooves;

(3) telescoping the inner section with gaskets in the grooves into the outer section to a predetermined depth;

(4) attaching two conduits to the recesses by two respective passageways through the outer section at generally vertically diametrically opposite positions;

(5) pressurizing the space between the sealing gaskets by closing one conduit and introducing a fluid under superatmospheric pressure into the other conduit to test the sealing capabilities of the gaskets in the assembled joint;

(6) introducing a solidifiable fluid grout through the conduit attached to the lower passageway until the recess is filled with grout and substantially no air bubbles are present; and (7) allowing the grout to solidify.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THIS INVENTION

Figure 1:
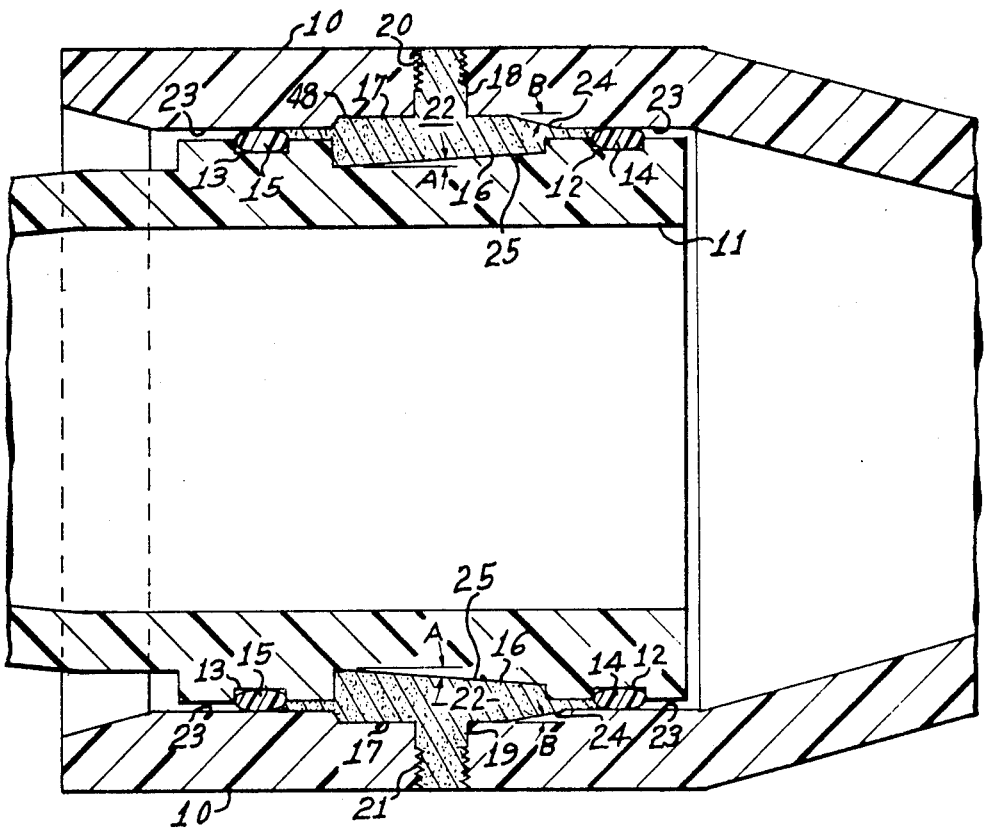
FIG. 1 is a cross sectional view of one embodiment of the pipe joint of this invention.
Figure 2:
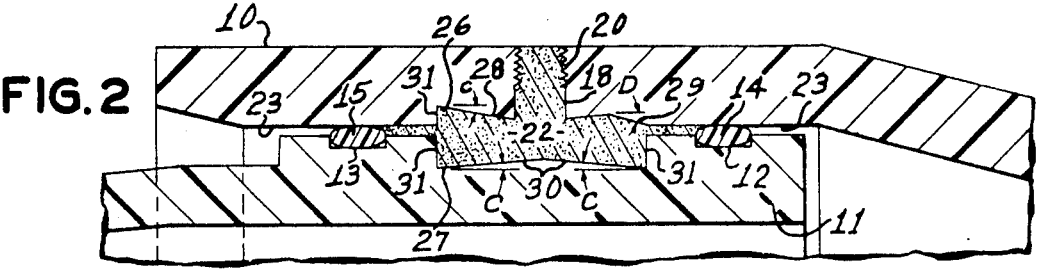
FIG. 2 is a partial cross sectional view of a second embodiment of the pipe joint of this invention.
Figure 3:
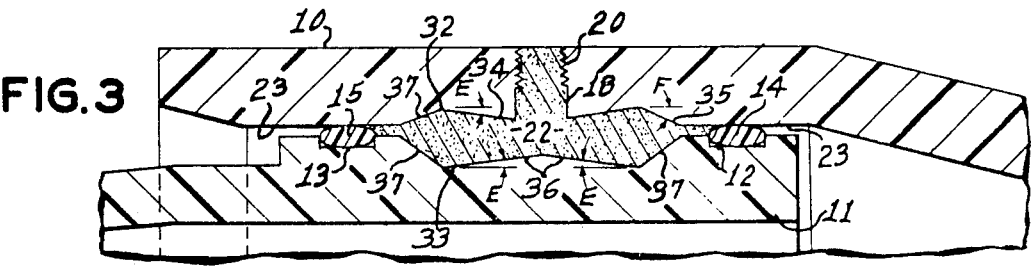
FIG. 3 is a partial cross sectional view of a third embodiment of the pipe joint of this invention.

In FIGS. 1–3 there is shown the details of the pipe joint of this invention. Each pipe section of a continuous pipe line is fashioned at its two ends to fit with an adjoining pipe section to produce a male-female telescopic joint. Such a joint is commonly known as a bell-and-spigot joint, the bell being the female component and the spigot being the male component. For convenience in manufacture and assembly each pipe section has the male component (spigot) on one end and the female component (bell) on the other end. Pipe sections with bell-and-spigot joints are available in virtually all sizes of pipe, but are very common in sizes of 4 inches and larger. The pipe may be made of any material, e.g., cast iron, cement, plastic, etc., and normally is manufactured by molding techniques.

The critical part of the assembly of large diameter pipe lines is the making of each joint so it will retain its sealing properties even though the joint may be subjected to stresses caused by settling of the earth where the pipe is laid or by tensile forces in the general direction of the axis of the pipe. In FIG. 1 there is shown the bell 10 of one pipe section and spigot 11 of the next adjoining pipe section telescoped together to make a pipe joint. The joint is sealed with two ring seal gaskets 14 and 15 which are retained, respectively, in forward seal groove 12 and rearward seal groove 13 and which are compressed against the inside sealing surface 23 of bell 10. Gaskets 14 and 15 are spaced apart in the longitudinal direction along the axis of the pipe. Between gaskets 14 and 15 is a space 22 filled with grout that adheres to bell 10 and to spigot 11. Space 22 is annular in form and is produced by the combination of a circumferential recess 17 in the inner surface of bell 10, and the allowance between the outside surface of spigot 11 and the inside surface of bell 10. In order to provide access to space 22 an upper passageway 18 and a lower passageway 19 communicates through the wall of bell 10. Space 22 is filled with an adhesive grout as the final step in producing a strong nonrotatable joint. It is generally convenient to tap passageways 18 and 19 at 20 and 21, respectively, so as to provide a means for attaching a pipe nipple through which grout may be introduced into space 22.

The shape of space 22 is important in producing a joint that is strongly resistant to longitudinal stresses. This is due to the fact that the solidified grout in space 22 acts like a mechanical key in resisting axial movement of the pipe sections. Furthermore, the solidified grout cannot rotate in space 22 which is a common cause of failure in prior art joints. Among the important shape features is one involved in the assembly of spigot 11 into bell 10. As spigot 11 enters bell 10 there is the possibility that forward ring seal gasket 14 will slip out of groove 12, even though a lubricant may be employed on the inside surface of bell 10 and on gasket 14 to reduce friction therebetween. It has been found advantageous to shape recess 17 along its rearward edge with a conical tapered surface 24 which helps to keep gasket 14 in groove 12. Angle B may be about 10°–30°, although it is preferred to be about 20°. It is, of course, important for gaskets 14 and 15 to be properly seated in order to provide a pressure tight, leak-proof seal.

Another portion of space 22 which must be shaped in a special way to provide extra strength to the pipe joint is surface 25 which is the bottom surface of the recess or depression 16 in inner spigot section 11. This surface is sloped at an angle A which is from about 2° to about 10°, preferably about 5°. The slope as may be seen in FIG. 1 is such that space 22 is thicker (radially from the axis of the pipe) at the end near rearward ring seal gasket 15 than at the end near forware ring seal gasket 14. This shape provides a resistance to the tensile stresses that may be present tending to pull apart the two joined pipe sections. The space 22 is wedge-shaped similar to a mechanical key, which opposes all forces tending to pull spigot 11 out of bell 10. Any force tending to move spigot 11 to the left in FIG. 1 causes a tightening of surface 25 against the grout in space 22 and a resistance to any movement of spigot 11 to the left. Similarly, forces tending to move spigot 11 to the right (deeper into bell 10) are resisted by the wedging action against inclined surface 24. Thus the shape of space 22 helps to provide a strong, immovable joint. While FIG. 1 shows surface 25 to be sloped to produce the wedge shape it is entirely suitable to slope bottom surface 48 of recess or depression 17 in outer bell section 10 to obtain the desired wedge shape, regardless of whether surface 25 is sloped or not.

In a test of a joint as shown in FIG. 1 against a joint where angles A and B were 0° (i.e. where space 22 was essentially rectangular in cross section) where all other characteristics were identical, the joint of FIG. 1 withstood internal test pressures of approximately three times that of the prior art joint before structural failure occurred. The test involves preparing the joint, capping the pipe sections on both sides of the joint to form a test cylinder, and introducing fluid under increasing pressure to the inside of the cylinder until the joint fails. Such a test produces both hoop and axial tensile stresses on the joint under conditions similar to those expected to be encountered in actual usage.

In FIG. 2 there is shown a portion of a second embodiment of the pipe joint wherein space 22 is different from that of FIG. 1. Otherwise both joints are identical. In FIG. 2 space 22 is shaped with a double wedge contour or butterly shape. The thickness of space 22 in a radial direction and midway between edges 31 is less than the thickness at each of edges 31. Angles C are from about 2° to about 10°, preferably about 5°. Surface 30 inclines from a high point adjacent passageway 18 to low points (deeper into the wall of spigot 11) at edges 31. In the same fashion, surface 28 inclines from a high point near passageway 18 to a low point (deeper into the wall of bell 10) at edge 31. The rearward portion of recess 26, adjacent ring seal gasket 14, is sloped at surface 29 to help maintain gasket 14 in groove 12 when assembling the joint. Surface 29 slopes at an angle D of about 10° to about 30°, preferably about 20°. This shape of space 22 provides for a double wedging action to resist movement of spigot 11 longitudinally in either direction with respect to bell 10.

In FIG. 3 there is shown a third embodiment of the pipe joint of this invention, the differences being found solely in the shape of space 22. In this instance, space 22 has a double wedge or butterfly shape generally similar to that shown in FIG. 2 except that edges 37 in FIG. 3 are not as sharply angled from surfaces 34 and 36 as are the comparable components in FIG. 2 where edges 31 are almost at right angles with surfaces 28 and 30. It is well known that in stress analysis of shapes, sharp corners (as at the corner of edge 31 and surface 30 in FIG. 2) are places where fractures begin to occur when stresses reach a level approaching the failure limit of the structure. For this reason many structures are designed to eliminate such sharp corners. The design of FIG. 3 does exactly that. Angles E are from about 2° to about 10°, preferably 5°. Surface 35 is inclined at an angle F, about 10° to about 30°, preferably about 20°, to facilitate assembly of spigot 11 into bell 10 while keeping gasket 14 properly seated in groove 12.

Figure 4:
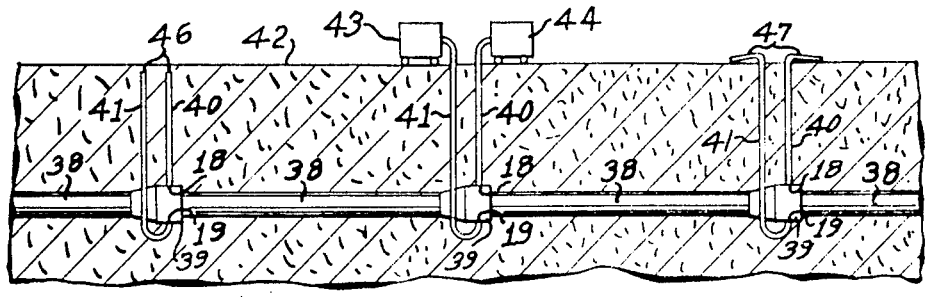
FIG. 4 is a schematic view of a method of laying an underground pipe line in accordance with this invention.

In FIG. 4 there is an illustration of the method of laying pipe in accordance with this invention. The illustration shows the laying of pipe underground, although it is to be understood that the method is similarly operable when the pipe is not covered or is above ground level. Pipe sections 38 are assembled and made ready to be joined, spigot to bell in the desired location. Sealing gaskets are placed in the grooves of each spigot (see grooves 12 and 13 and gaskets 14 and 15 in FIG. 1). The inside surface of each bell, the outside surface of each spigot, and the gaskets are coated with a suitable lubricant and sizing material. This material not only facilitates the assembly of the spigot and gaskets into the bell without displacing or disrupting the gaskets from their proper seating in their respective grooves, but also prepares the surfaces of space 22 and the adjoining facing surfaces of spigot 11 and bell 10 to be receptive to a grout that fills space 22. The lubricant makes these surfaces more adherent to the grout. The spigot and its gaskets properly lubricated is then inserted into the bell to the appropriate depth. Tubes 40 and 41 are then attached to upper passageway 18 and lower passageway 19, respectively. The joint is then tested by pressurizing the annular space between sealing gaskets 14 and 15 using tubes 40 and 41 as access conduits for the pressurized fluid. If no pressure drop of the pressurizing fluid occurs, after a required time, the seal is considered to be tight. Earth is then backfilled into the trench where the pipe is laid, taking care to keep tubes 40 and 41 attached to passageways 18 and 19 with the upper ends 47 of tubes 40 and 41 accessible above ground level 42. A grout sump 43 is connected to tube 41 and a vacuum pump 44 is connected to tube 40. Grout is introduced through tube 41 into passageway 19 while air is sucked out of passageway 18 through tube 40 until space 22 is filled with grout. Tubes 40 and 41 are then cut and left under the ground level 42 as at 46 while sump 43 and pump 44 move on to the next pair of tubes 40 and 41 (as at 47) to fill the grout space of the next joint, and so on until the entire pipe line is completed.

For a fiber glass reinforced vinylester plastic pipe a suitable grout is a vinylester resin with or without a filler. A preferred combination is a mixture of 70% Derakane 470 (vinylester resin made and sold by Dow Chemical Company) and 30% miniature hollow glass balloons (about 0.001–0.005 inch in diameter). A preferred lubricant and sizing material for this type of grout is Derakane XD 8084.03 primer (made and sold by Dow Chemical Company).

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what is desired to secure by Letters Patent of the United States is:

1. A method of laying, testing, and assembling sections of pipe into an indefinite length of piping which comprises the sequential steps of:
   (1) positioning an inner pipe section and an outer pipe section in general longitudinal alignment for joining by telescoping the two sections together, the two sections when joined having aligned circumferential recesses in their facing surfaces adjacent the telescoping ends, and the inner section having a pair of circumferential grooves spaced on opposite ends of the recess;
   (2) placing two spaced ring sealing gaskets around the inner section respectively in the grooves;
   (3) telescoping the inner section with gaskets in the grooves into the outer section to a predetermined depth;
   (4) attaching two conduits to the recesses by two respective passageways through the outer section at generally vertically diametrically opposite positions;
   (5) pressurizing the space between the sealing gaskets by closing one conduit and introducing a fluid under superatmospheric pressure into the other conduit to test the sealing capabilities of the gaskets in the assembled joint;
   (6) covering the joined pipe sections wtih earth and allowing the sections to settle and extending the conduits from the pipe sections to above ground level;
   (7) thereafter introducing a solidifiable fluid grout through the conduit attached to the lower passageway until the recess is filled with grout and substantially no air bubbles are present; and
   (8) allowing the grout to solidify.

2. The method of claim 1 wherein step (7) additionally includes applying a vacuum to the conduit attached to the upper passageway while grout is introduced through the lower passageway.

3. The method of claim 1 further comprising the step of (9) repressurizing the space between the sealing gaskets by closing one conduit and introducing a fluid under superatmospheric pressure into the other conduit to test the sealing capabilities of the gaskets in the assembled joint after step (6) and before step (7).

4. The method of claim 1 wherein step (2) includes coating the sealing gaskets and the inside surface of the bell section with a lubricant.

5. The method of claim 1 wherein step (1) includes forming the edges of the recesses at an angle with respect to the adjacent inside or outside surface of the respective outer and inner sections.

6. The method of claim 1 wherein step (1) includes forming at least one circumferential recess to have a cross section, as seen on a plane containing the axis of the pipe section, which is wedge shaped with its thickest dimension adjacent the end of the inner section and its thinnest dimension adjacent the end of the outer section.

7. The method of claim 1 wherein step (1) includes forming at least one circumferential recess to have a cross section, as seen on a plane containing the axis of the pipe section, which is butterfly shaped with its thinnest section midway between the two edges of the recess and thicker sections adjacent each edge of the recess.

8. A method of laying and assembling sections of pipe into an indefinite length of piping which comprises the steps of:
   (1) positioning an inner pipe section and an outer pipe section in general longitudinal alignment in a trench below ground level for joining by telescoping the two sections together with the two sections when joined having aligned circimferential recesses in their facing surfaces adjacent the telescoping ends and forming a ring passageway with the inner section having a pair of circumferential grooves spaced on opposite ends of its recess;
   (2) placing two spaced ring sealing gaskets around the inner section respectively in the pair of grooves;
   (3) telescoping the inner section with the two gaskets in the pair of grooves into the outer section to a predetermined position;
   (4) attaching two elongated conduits to the ring passageway by two respective passages extending laterally through the outer section at generally vertical diametrically opposed positions;
   (5) covering the joined pipe sections with earth and allowing the sections to settle;

(6) thereafter introducing a solidifiable fluid grout from above the trench through the conduit attached to the lower passage until the ring passageway is filled with grout; and (7) allowing the grout to solidify.

9. The method of claim 8 further comprising the step of (8) pressurizing the spaced between the sealed gaskets by closing one conduit and introducing a fluid under superatmospheric pressure into the other conduit to test the sealing capabilities of the gaskets in the assembled joint; wherein step (8) is accomplished between steps (5) and (6).

10. The method of claim 8 further comprising the step of (8) pressurizing the space between the sealing gaskets by closing one conduit and introducing a fluid under superatmospheric pressure into the other conduit to test the sealing capabilities of the gaskets in the assembled joint; wherein step (8) is accomplished between steps (4) and (5).

11. The method of claim 8 wherein step (6) additionally includes applying a vacuum to the conduit attached to the upper passageway while fluid grout is introduced through the lower passageway to inhibit air bubble formation with the grout.

12. The method of claim 8 wherein step (4) includes extending the conduits from the outer pipe section to above ground level.

13. The method of claim 8 wherein step (2) includes coating the sealing gaskets and the inside surface of the bell section with a lubricant.

14. The method of claim 8 wherein step (1) includes forming the edges of the recesses at an angle with respect to the adjacent inside or outside surface of the respective outer and inner sections.

15. The method of claim 8 wherein step (1) includes forming at least one circumferential recess to have a cross section, as seen on a plane containing the axis of the pipe section, which is wedge shaped with its thickest dimension adjacent the end of the inner section and its thinnest dimension adjacent the end of the outer section.

16. The method of claim 8 wherein step (1) includes forming at least one circumferential recess to have a cross section, as seen on a plane containing the axis of the pipe section, which is butterfly shaped with its thinnest section midway between the two edges of such recess and thicker sections adjacent each edge of such recess.

17. A method of laying, testing, and assembling sections of pipe into an indefinite length of piping which comprises the steps of:

(1) positioning an inner pipe section and an outer pipe section in general longitudinal alignment in a trench below ground level for joining by telescoping the two sections together with the two sections when joined having aligned circumferential recesses in their facing surfaces adjacent the telescoping ends and forming a ring passageway with the inner section having a pair of circumferential grooves spaced on opposite ends of its recess;

(2) placing the two spaced ring sealing gaskets around the inner section respectively in the pair of grooves;

(3) telescoping the inner section with the two gaskets in the pair of grooves into the outer section to a predetermined depth;

(4) attaching two elongated conduits to the ring passageway by two respective passages extending laterally through the outer section at generally vertically diametrically opposed positions;

(5) pressurizing the space between the sealing gaskets by closing one conduit and introducing a fluid under superatmospheric pressure into the other conduit to test the sealing capabilities of the gaskets in the assembled joint;

(6) covering the joined pipe sections with earth and alowing the sections to settle;

(7) thereafter introducing a solidifiable fluid grout from above the trench through the conduit attached to the lower passage until the ring passageway is filled with grout;

(8) burying below ground level the upper ends of any remainder of the two conduits; and (9) allowing the grout to solidify.

18. The method of claim 17 wherein step (7) additionally includes the steps of (10) applying a vacuum to the conduit attached to the upper passageway while fluid is introduced through the lower passageway to inhibit air bubble formation with the grout.

19. The method of claim 17 further comprising the step of (10) repressurizing the space between the sealing gaskets by closing one conduit and introducing a fluid under superatmospheric pressure into the other conduit to test the sealing capabilities of the gaskets in the assembled joint after step (6) and before step (7).

20. The method of claim 17 wherein step (1) includes the step of (10) forming at least one edge of the inside surface of the outer section at an angle to create a solidified grout wedge to inhibit longitudinal decoupling movement between the outer and inner sections while the solidified grout in two passages inhibit relative rotation between the outer and inner sections.

* * * * *